June 26, 1956      R. G. TOWLE      2,752,590
INSULATION FAILURE DETECTOR FOR ELECTRIC CABLES
Filed March 1, 1954
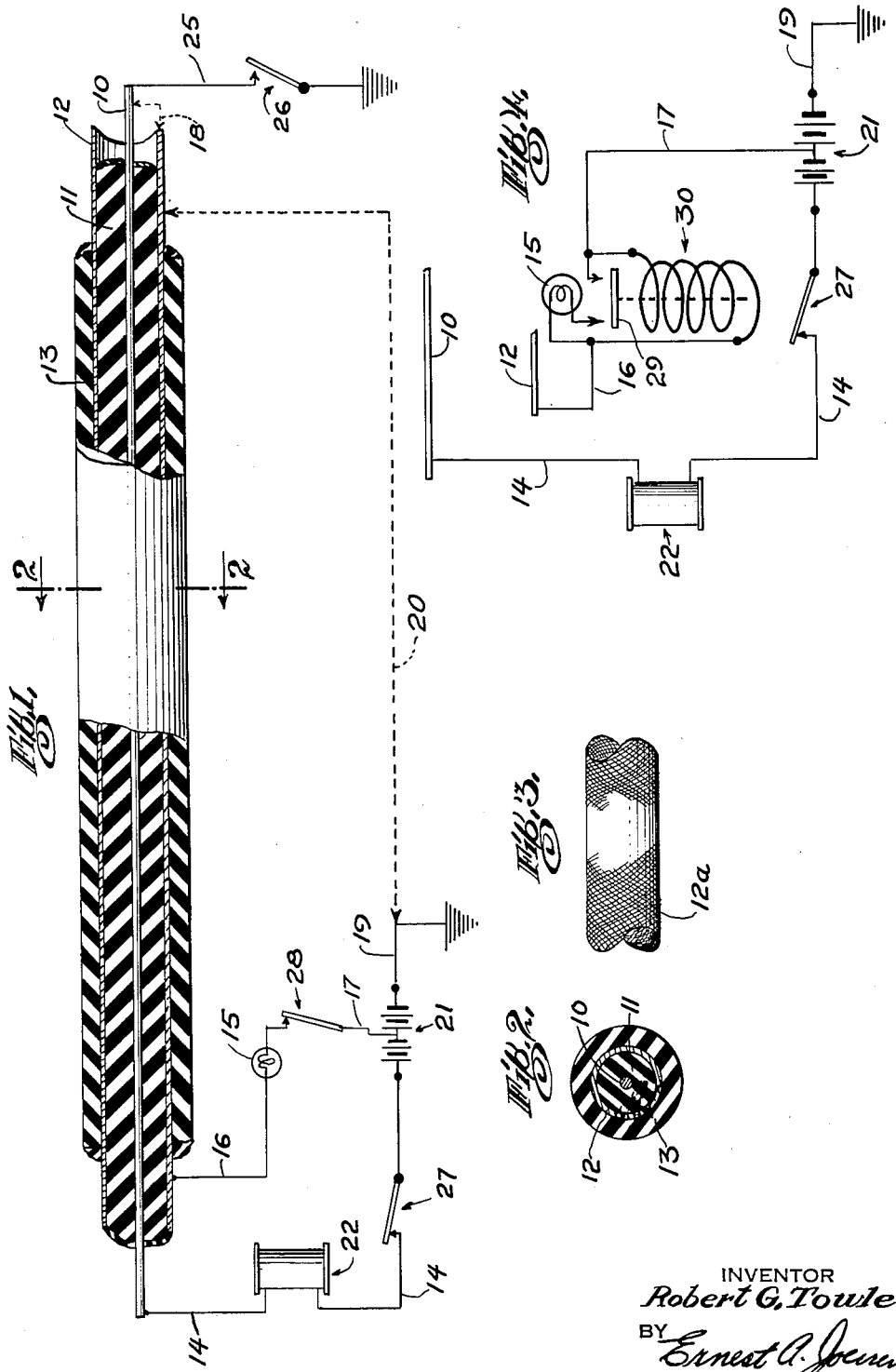
INVENTOR
*Robert G. Towle*
BY *Ernest A. Joerns*
ATTORNEY 大专利 2,752,590
Patented June 26, 1956

2,752,590

INSULATION FAILURE DETECTOR FOR ELECTRIC CABLES

Robert G. Towle, Summit Hill, N. Y., assignor to Specialties Development Corporation, Belleville, N. J., a corporation of New Jersey Application March 1, 1954, Serial No. 413,192

8 Claims. (Cl. 340—255)

The present invention relates to insulated, electrically conductive cables or wires, and, more particularly, to such cables or wires constructed and arranged for detecting the failure of their insulation when connected in an electrical network or system.

Apparatus for automatically initiating the operation of safety equipment on craft or vehicles in the event of collision of the craft heretofore has been proposed. Such apparatus comprises a normally open switch mounted on the craft adjacent a zone of the craft vulnerable to deformation upon collision or crash of the craft and having one side connected (grounded) to the frame or body of the craft, the switch being adapted to close upon crash or collision of the craft in response to inertia or impact or deformation thereof, electromagnetic means for effecting operation of the safety equipment including an energizable winding usually located remotely of the zone, a conductor electrically connecting the other side of the switch to one side of the winding and extending along the frame of the craft usually in close proximity thereto but normally being insulated therefrom or out of contact therewith, and a source of electrical energy usually closer to the electromagnetic means than to the switch having one side connected to the frame of the craft and having its other side connected to the other side of the winding, whereby, upon collision or crash of the craft and substantial deformation of the craft at any point along the conductor between the switch location and the winding location with attendant disruption of the switch to an extent to cause failure of said switch to close effectively and disruption of the conductor, the conductor is adapted to make electrical contact with the frame of the craft to effect energization of the winding and whereby operation of the safety equipment is assured.

In the event the insulation of the conductor or other means insulating this conductor from the frame of the craft should fail or be impaired in the normal operation of the craft without collision or crash, the conductor would contact the frame and cause unintentional operation of the safety equipment.

Accordingly, an object of the present invention is to provide a cable or wire adapted to be utilized as the aforementioned conductor which is constructed and arranged to give an indication that its insulation has failed before the electricity conducting element thereof can come in contact with the frame and cause false operation of the safety equipment.

Another object is to provide such a cable which is simple and economical in construction and is foolproof in operation.

Another object is to provide such a cable which lends itself to installation in a simple and practical system for detecting failure of its insulation.

A further object is to provide such a cable which has utility in numerous applications where it is essential to detect insulation failures instantly rather than to rely on periodical tests.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a cable or wire for conducting electricity which comprises an electrically conductive wire or the like, insulation covering the wire, an electrically conductive shield surrounding the insulation, and insulation covering the shield. Such a cable is adapted for use in a system arranged to detect failure of either the inner or outer insulation which includes a source of electrical energy having one side connected to the wire, electrically operated audible or visible indicating means having one terminal connected to the other side of the source and having another terminal connected to the shield, and a second source of electrical energy having one side connected to the first mentioned terminal of the indicating means and having its other side grounded, whereby, upon failure of the inner insulation and the establishment of contact between the wire and the shield, operation of the indicating means is effected, and, upon failure of the outer insulation and grounding of the shield, operation of indicating means is effected.

A preferred embodiment of the invention has been chosen for the purpose of illustration and description, and is shown in the accompanying drawing, forming a part of the specification, wherein:

Fig. 1 is a schematic wiring diagram embodying a cable in accordance with the present invention, wherein a portion of the cable is shown on an enlarged scale partly in section and partly in elevation.

Fig. 2 is a sectional view taken along the line 2—2 on Fig. 1.

Fig. 3 is a fragmentary elevational view of a modified form of shield for the cable.

Fig. 4 is a wiring diagram illustrating a modified network.

Referring to the drawing in detail and more particularly to Figs. 1 and 2 thereof, a small portion of a cable is shown which cable may be of indefinite length. This cable comprises an electrically conductive wire 10, insulation 11 covering the wire (referred to herein as the inner insulation), an electrically conductive shield 12 surrounding the inner insulation 11, and insulation 13 covering the shield 12 (referred to herein as the outer insulation).

The wire 10 is illustrated as a single strand of circular cross-section, although it will be understood that it may have any other desired cross-section or may be composed of a plurality of twisted or braided strands or may be in the form of a conductive tube, flat strip or the like, the essential feature being that it serves as a conductor of electricity to supply electrical energy from a source to a device to be operated.

In Figs. 1 and 2, the shield is illustrated as a cylindrical metallic tube, although it may have any desired cross-sectional shape other than circular. It will also be appreciated that this tube could be perforated to reduce its weight and increase its flexibility.

The inner and outer insulation 11 and 13 may be of any common variety adapted to be applied to the wire 10 and the shield 12, respectively, in any suitable manner, for example, by braiding the same thereon. In the cable construction described so far, the insulation 11 is applied to the wire 10 and this assembly is inserted into the shield 12, and the insulation 13 is then applied to the shield 12.

In Fig. 3, a shield 12a is shown which is woven or braided of a plurality of wire strands to provide a tube constructed of wire mesh. Such a shield is light in weight, is very flexible and facilitates application thereof about the insulation 11 because it can be twisted, woven or braided directly on the insulation.

Failure of the inner insulation 11 enables contact to be established between the wire 10 and the shield 12. Such contact can be detected by electrically connecting the wire 10 by a line 14 to one side of a source of electrical energy, electrically connecting one terminal of an indicating device 15, such as a lamp, annunciator, bell or the like, to the shield 12 by a line 16, and electrically connecting another terminal of the indicating device to the other side of the source of energy by a line 17, whereupon, if contact between the wire 10 and the shield 12 is established, as indicated by the broken line 18 (Fig. 1), the indicating device 15 is energized to notify the operator or attendant of such contact.

Failure of the outer insulation 13 enables contact to be established between the shield 12 and the frame (ground) of the craft. Such contact can be detected by electrically connecting one side of a second source of electrical energy to the line 17 and electrically connecting the other side of this source to the ground or frame by a line 19, whereupon, if contact between the shield 12 and ground is established as indicated by the broken line 20 (Fig. 1), the indicating device is energized.

As a practical matter, a battery 21 having a series of cells constitutes the two sources of electrical energy just referred to, and the line 17 is connected in voltage dividing relation to the connection between the respective positive and negative poles of adjacent cells, whereby the cell section at the left side of this connection (as viewed) is the first source and the cell section at the right side of this connection (as viewed) is the second source.

The line 17 may be so connected that the potentials of the cell sections are of a value ranging from about equal to each other to a value that the potential of either cell section is less than twice that of the other cell section.

As illustrated in Fig. 1, the wire 10 is utilized for conducting electrical current from the battery at its entire cell potential to a load or an electrically operated device, such as a relay having a coil 22 connected in the line 14. One terminal of the coil 22 is electrically connected to the positive side of the battery 21 and the other terminal of the coil 22 is electrically connected to one end of the wire 10 by the line 14. The other end of the wire 10 is electrically connected to the negative or grounded side of the battery by a line 25 having a normally open switch 26 therein; whereby, upon closing of the switch 26, the coil 22 is energized under full battery potential.

Also, in the event of collision or crash and disruption of the cable so that the wire 10 contacts the frame of the craft or the wire 10 contacts the shield 12 and the shield in turn contacts the frame of the craft, the coil 22 likewise is energized under full battery potential. Such operation is facilitated by the form of shield 12a shown in Fig. 3, because the wires will fray and provide numerous points of contact.

It will be noted that, when the wire 10 contacts the shield 12 due to failure of the inner insulation 11, the coil 22 is subjected to the potential of the cell section at the left side of the battery (as viewed) through lines 14, 16 and 17. However, such potential is insufficient to cause the coil 22 to operate the armature of the relay with which it is associated. In order to guard against any unintentional relay operation due to prolonged partial energization of the coil 22, a normally closed switch 27 is placed in the line 14 which may be opened by the operator to cut out the coil 22.

Alternatively, a normally closed switch 28 may be connected in the line 17 to serve the same purpose as that of the switch 27.

As shown in Fig. 4, the indicating device 15 could be connected in the lines 16 and 17 by a normally open switch 29 adapted to be closed by a relay 30 connected in the lines 16 and 17. This relay may have a high impedance to thereby limit the flow of current through the coil 22.

From the foregoing description, it will be seen that the present invention provides an improved cable of the safety wire type wherein failure of the insulation is readily detected by a simple, practical system.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a system for detecting the failure of the insulation of a cable for conducting electricity, the combination of an electrically conductive wire, insulation covering said wire, an electrically conductive shield surrounding said insulation, insulation covering said shield, a source of electrical energy, one end of said wire being connected to one side of said source and its other end being grounded, electrically operated indicating means having one terminal connected to the other side of said source and having another terminal connected to said shield, and a second source of electrical energy having one side connected to said first mentioned terminal of said indicating means and having its other side grounded, whereby, upon failure of said first insulation and the establishment of contact between said wire and said shield, operation of said indicating means is effected, and, upon failure of said second mentioned insulation and grounding of said shield, operation of said indicating means is effected.

2. In a system for detecting the failure of the insulation of a cable for conducting electricity, the combination of an electrically conductive wire, insulation covering said wire, an electrically conductive shield surrounding said insulation, insulation covering said shield, a source of electrical energy having one side connected to said wire, indicating means having one terminal connected to said shield, a normally open switch for connecting the other terminal of said indicating means to the other side of said source, electrically operated means for effecting closing of said switch having one terminal connected to said last mentioned side of said source and having its other terminal connected to said shield, and a second source of electrical energy having one side connected to said first mentioned terminal of said electrically operated means and having its other side grounded, whereby, upon failure of said first insulation and the establishment of contact between said wire and said shield, operation of said indicating means is effected, and, upon failure of said second mentioned insulation and grounding of said shield, operation of said indicating means is effected.

3. In a system for detecting the failure of the insulation of a cable for conducting electricity, the combination of an electrically conductive wire, insulation covering said wire, an electrically conductive shield surrounding said insulation, insulation covering said shield, a source of electrical energy, a conductor connecting one side of said source to one end of said wire, a load connected in said conductor, indicating means having one terminal connected to the other side of said source and having another terminal connected to said shield, a second source of electrical energy having one side connected to said last mentioned terminal of said indicating means and having its other side grounded, a second conductor connecting said last mentioned side of said second source to the other end of said wire, and a normally open switch in said second conductor for energizing said load, whereby, upon failure of said first insulation and the establishment of contact between said wire and said shield, operation of said indicating means is effected, and, upon failure of said second mentioned insulation and grounding of said shield, operation of said indicating means is effected.

4. In a system for detecting the failure of the insulation of a cable for conducting electricity, the combination of an electrically conductive wire, insulation covering said wire, an electrically conductive shield surrounding said insulation, insulation covering said shield, a source of electrical energy, a conductor connecting one side of said source to one end of said wire, a load connected in said conductor, a normally closed switch in said conductor, indicating means having one terminal connected to the other side of said source and having another terminal connected to said shield, a second source of electrical energy having one side connected to said last mentioned terminal of said indicating means and having its other side grounded, a second conductor connecting said last mentioned side of said second source to the other end of said wire, and a normally open switch in said second conductor for energizing said load, whereby, upon failure of said first insulation and the establishment of contact between said wire and said shield, operation of said indicating means is effected, and, upon failure of said second mentioned insulation and grounding of said shield, operation of said indicating means is effected.

5. In a system for detecting the failure of the insulation of a cable for conducting electricity, the combination of an electrically conductive wire, insulation covering said wire, an electrically conductive shield surrounding said insulation, insulation covering said shield, a source of electrical energy having one side connected to said wire, electrically operated indicating means, a conductor connecting one terminal of said indicating means to the other side of said source and connecting the other terminal of said indicating means to said shield, a normally closed switch in said conductor, and a second source of electrical energy having one side connected to said first mentioned terminal of said indicating means and having its other side grounded, whereby, upon failure of said first insulation and the establishment of contact between said wire and said shield, operation of said indicating means is effected, and, upon failure of said second mentioned insulation and grounding of said shield, operation of said indicating means is effected.

6. In a system for detecting the failure of the insulation of a cable for conducting electricity, the combination of an electrically conductive wire constituting a circuit making element, insulation covering said wire, an electrically conductive shield surrounding said insulation and constituting a circuit making element, insulation covering said shield, a source of electrical energy, one end of said wire being connected to one side of said source and the other end of said wire being grounded, indicating means having one terminal connected to one of said elements, electrically operated means having one terminal connected to the other side of said source and having its other terminal connected to the other of said elements, a second source of electrical energy having one side connected to said first mentioned terminal of said electrically operated means and having its other side grounded, and a normally open switch constructed and arranged to be closed by said electrically operated means to connect the other terminal of said indicating means across one of said sources whereby, upon failure of said first insulation and the establishment of contact between said wire and said shield, operation of said indicating means is effected, and, upon failure of said second mentioned insulation and grounding of said shield, operation of said indicating means is effected.

7. In a system for detecting the failure of the insulation of a cable for conducting electricity, the combination of an electrically conductive wire constituting a circuit making element, insulation covering said wire, an electrically conductive shield surrounding said insulation and constituting a circuit making element, insulation covering said shield, a source of electrical energy, one end of said wire being connected to one side of said source and the other end of said wire being grounded, an indicating lamp having one terminal connected to one of said elements, a solenoid having one terminal connected to the other side of said source and having its other terminal connected to the other of said elements, a second source of electrical energy having one side connected to said first mentioned terminal of said solenoid and having its other side grounded, and a normally open switch constructed and arranged to be closed by said solenoid to connect the other terminal of said lamp across one of said sources whereby, upon failure of said first insulation and the establishment of contact between said wire and said shield, illumination of said lamp is effected, and, upon failure of said second mentioned insulation and grounding of said shield, illumination of said lamp is effected.

8. In a system for detecting the failure of the insulation of a cable for conducting electricity, the combination of an electrically conductive wire constituting a circuit making element, insulation covering said wire, an electrically conductive shield surrounding said insulation and constituting a circuit making element, insulation covering said shield, a source of electrical energy, one end of said wire being connected to one side of said source and the other end of said wire being grounded, indicating means having one terminal connected to one of said elements, electrically operated means having one terminal connected to the other side of said source and having its other terminal connected to the other of said elements, a second source of electrical energy having one side connected to said first mentioned terminal of said electrically operated means and having its other side grounded, a load connected by said wire across said sources, and a normally open switch constructed and arranged to be closed by said electrically operated means to connect the other terminal of said indicating means across one of said sources whereby, upon failure of said first insulation and the establishment of contact between said wire and said shield, operation of said indicating means is effected, and, upon failure of said second mentioned insulation and grounding of said shield, operation of said indicating means is effected.

References Cited in the file of this patent

UNITED STATES PATENTS

| | | |
|---|---|---|
| 2,087,783 | Savage | July 20, 1937 |
| 2,179,901 | Smith | Nov. 14, 1939 |
| 2,662,932 | Warner | Dec. 15, 1953 |
| 2,684,475 | Lode | July 20, 1954 |